(12) United States Patent
Olarig et al.

(10) Patent No.: US 8,286,015 B2
(45) Date of Patent: Oct. 9, 2012

(54) STORAGE ARRAY POWER MANAGEMENT USING LIFECYCLE INFORMATION

(75) Inventors: Sompong Paul Olarig, Pleasanton, CA (US); Chris Lionetti, Duvall, WA (US); Shiv Rajpal, Sammammish, WA (US); Vladimir Sadovsky, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 556 days.

(21) Appl. No.: 12/477,737

(22) Filed: Jun. 3, 2009

(65) Prior Publication Data

US 2010/0313045 A1 Dec. 9, 2010

(51) Int. Cl.
G06F 1/26 (2006.01)
(52) U.S. Cl. ........ 713/320; 713/300; 713/310; 713/323; 713/324; 711/112; 711/114; 711/118; 711/154
(58) Field of Classification Search .................. 713/300, 713/310, 320, 323, 324; 711/112, 114, 118, 711/154
See application file for complete search history.

(56) References Cited

U.S. PATENT DOCUMENTS

| | | | |
|---|---|---|---|
| 6,832,289 B2 * | 12/2004 | Johnson | 711/112 |
| 7,007,048 B1 | 2/2006 | Murray et al. | |
| 7,340,616 B2 * | 3/2008 | Rothman et al. | 713/300 |
| 7,516,346 B2 * | 4/2009 | Pinheiro et al. | 713/324 |
| 7,698,517 B2 * | 4/2010 | Tulyani | 711/161 |
| 7,752,457 B2 * | 7/2010 | Yagawa | 713/189 |
| 7,769,947 B2 * | 8/2010 | Ranganathan et al. | 711/114 |
| 7,774,630 B2 * | 8/2010 | Hatasaki et al. | 713/320 |
| 7,844,701 B2 * | 11/2010 | Ramany et al. | 709/224 |
| 7,908,503 B2 * | 3/2011 | Mizuno | 713/324 |
| 7,962,704 B2 * | 6/2011 | Fujibayashi et al. | 711/154 |
| 8,006,038 B2 * | 8/2011 | Lionetti et al. | 711/118 |

(Continued)

FOREIGN PATENT DOCUMENTS

WO 2008058824 A1 5/2008

OTHER PUBLICATIONS

Mottram, Bill, Maid—"Massive Array of Idle Disk" Retrieved at <<http://www.veridictusassociates.com/images/MAID_Jan_WP.pdf>>, Veridictus Associates, Inc., Jan. 2009, pp. 1-12.

Gurumurthi, et al., "DRPM: dynamic speed control for power management in server class disks" Retrieved at <<http://www.cs.virginia.edu/papers/Dynamic_Speed_Control.pdf>>, Proceedings of the 30th Annual International Symposium on Computer Architecture, Jun. 9-11, 2003, pp. 11.

(Continued)

Primary Examiner — Brian Misiura

(57) ABSTRACT

A multi-device storage system can be arranged into power saving systems by placing one or more storage devices into a reduced power consuming state when the storage activity associated with the system is sufficiently reduced that an attendant decrease in throughput will not materially affect users of the storage system. Where data redundancy is provided for, a redundant storage device can be placed into the reduced power consuming state and its redundancy responsibilities can be transitioned to a partition of a larger storage device. Such transitions can be based on specific parameters, such as write cycles or latency, crossing thresholds, including upper and lower thresholds, they can also be based on pre-set times, or a combination thereof. Lifecycle information, including lifecycle information collected in real-time by storage devices on a block-by-block basis, can be utilized to obtain historical empirical data from which to select the pre-set times.

13 Claims, 9 Drawing Sheets

U.S. PATENT DOCUMENTS

| | | | |
|---|---|---|---|
| 8,006,111 B1* | 8/2011 | Faibish et al. | 713/324 |
| 8,009,501 B2* | 8/2011 | Sugiki et al. | 365/227 |
| 8,020,016 B2* | 9/2011 | Hatasaki et al. | 713/323 |
| 2004/0125727 A1 | 7/2004 | Schmidt et al. | |
| 2006/0004847 A1 | 1/2006 | Claudatos et al. | |
| 2006/0036605 A1 | 2/2006 | Powell et al. | |
| 2007/0079063 A1* | 4/2007 | Mizuno | 711/112 |
| 2008/0052331 A1 | 2/2008 | Ogawa et al. | |
| 2008/0126616 A1 | 5/2008 | Kumasawa et al. | |
| 2008/0155213 A1* | 6/2008 | Elliott et al. | 711/162 |
| 2008/0256307 A1* | 10/2008 | Fujimoto | 711/154 |
| 2010/0049917 A1* | 2/2010 | Kono et al. | 711/114 |
| 2010/0088470 A1* | 4/2010 | Lionetti et al. | 711/118 |
| 2010/0106990 A1* | 4/2010 | Kalman | 713/323 |
| 2010/0313044 A1* | 12/2010 | Rajpal et al. | 713/320 |

OTHER PUBLICATIONS

Storer, et al., "Pergamum: Replacing Tape with Energy Efficient, Reliable, Disk-Based Archival Storage" Retrieved at <<http://www.usenix.org/events/fast08/tech/full_papers/storer/storer_html/index.html>>, Proceedings of the 6th USENIX Conference on File and Storage Technologies, Feb. 26-29, 2008, pp. 1-19.

* cited by examiner

STORAGE ARRAY POWER MANAGEMENT USING LIFECYCLE INFORMATION

BACKGROUND

Modern storage media includes, not only media that store data in a physically sequential manner, such as traditional magnetic and optical storage media, but also media that store data in a physically random manner, such as solid-state based storage media. Such physically random media allow any one block of data to be accessed as efficiently as any other block of data. These, and other, physical differences between the various storage media commonly available today result in storage media that differ in capability, attributes and performance. For example, magnetic and optical media require a reading and writing apparatus that physically moves from the physical location of the device head to the physical location of a block. Consequently, the speed with which such storage media can read or write data is dependent upon the proximity of the locations of the data on the media, since the device head must physically transition from one location to the other. Conversely, solid-state based storage media can read and write data through electrical signals without requiring any physically moving parts. As a result, the data stored on such media can be written, or read, with efficiency that is not dependent upon the particular location of the data on, for example, rotating media.

Of particular concern can be the power efficiency of the various types of storage media and, more specifically, of the overall storage devices in which such media are housed. For example, as the power consumption of processing units and display units decreases due to designed power efficiencies, storage devices can consume a disproportionate amount of power, especially within the context of power-sensitive computing devices, such as portable computing devices that draw power from batteries or other un-tethered sources of power. Reductions in the power consumed to store and access data can enable portable computing devices to further decrease in weight and size by decreasing the amount of power required to be produced from the batteries and, thereby, enabling smaller and lighter batteries or other un-tethered sources of power. Similarly, as another example, the utilization of multiple storage devices to store and access data, such as a storage array that is presented as a single logical storage unit, or such as a storage cluster that can provide storage to multiple independent entities, can result in the consumption of a large quantity of power. In particular, not only do the storage devices themselves consume power, but at least some of that consumed power is released by the storage devices as excess heat that can be removed only though the consumption of additional power by one or more cooling systems.

SUMMARY

Application programs and operating systems can provide indicators regarding expected utilization of data or other such metadata associated with the data being utilized by the application programs and operating systems. Storage devices can provide information regarding their characteristics, including power consumption characteristics. Lifecycle information, such as information that can be collected in real-time by storage devices regarding the utilization of data on a block-by-block basis can be retained, by those storage devices, on their storage media and can provide a historical context to the utilization of the storage devices. Additional information relevant to power consumption, such as a current cost of power, power settings of a host computing device and other like information can be received from sensors, utilities or operating systems.

In one embodiment, one or more redundant storage devices can be placed into a reduced power consuming state and the redundancy provided by the storage devices placed into such a state can instead be provided by one or more partitions on a larger capacity storage device having, in aggregate, less power consumption than the one or more redundant storage devices placed into the reduced power consuming state.

In another embodiment, lifecycle data, or other historical data, can be referenced to identify pre-set times when one or more redundant storage devices can be placed into a reduced power consuming state. The one or more redundant storage devices can then be placed into those reduced power consuming states at the pre-set times.

In a further embodiment, parameters and thresholds can be established such that, when an established parameter crosses an established threshold, one or more redundant storage devices can either be placed into a reduced power consuming state or activated from a reduced power consuming state, as appropriate. Established parameters can include latency as experienced by a consumer of storage services provided by the storage devices, and aggregate write cycles directed to the storage devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
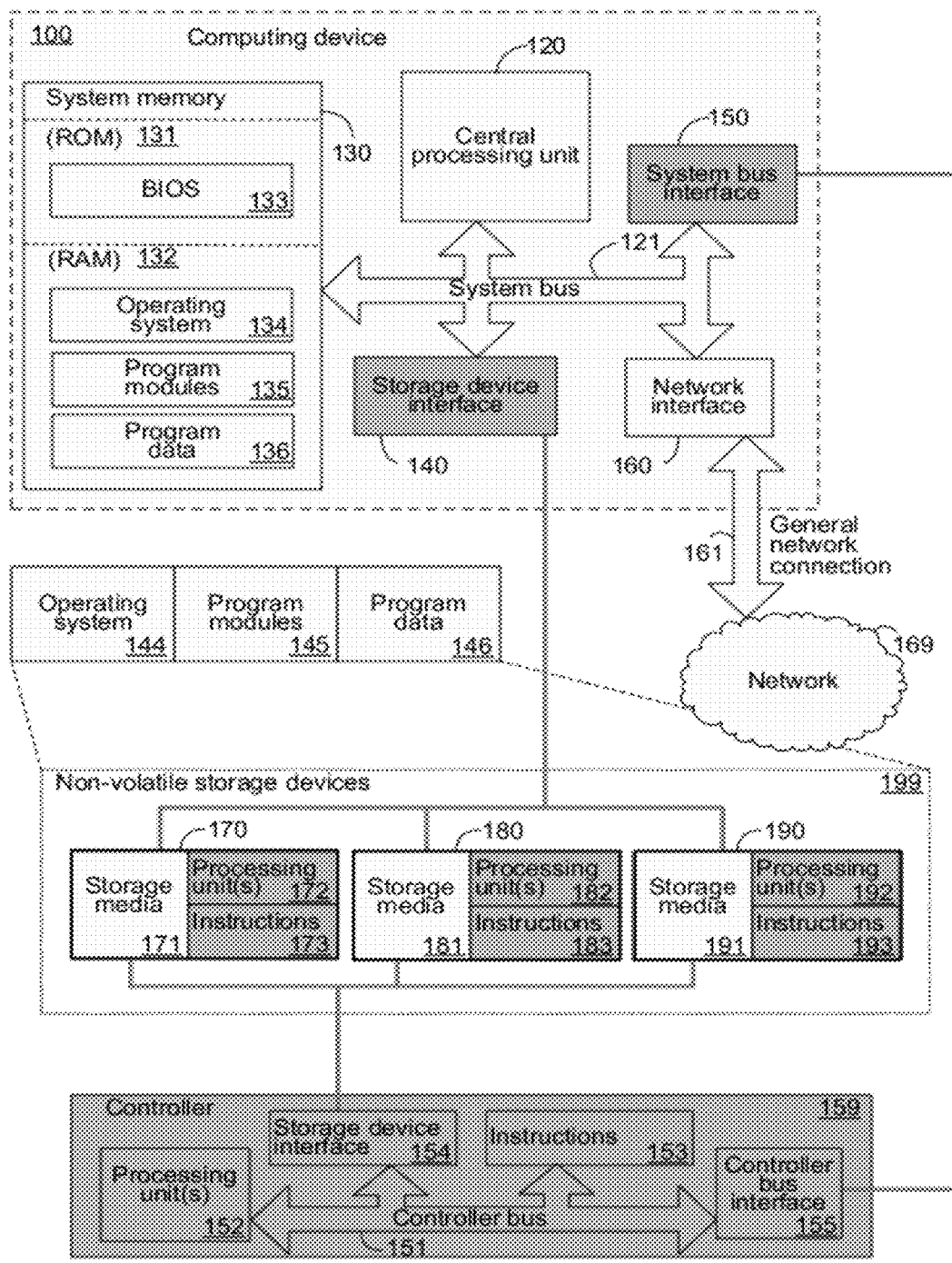
FIG. 1 is a block diagram of an exemplary computing device and storage hardware.

The following description relates to the placement of redundant storage devices into a reduced power consuming state during periods of reduced storage activity, while retaining redundancy through the use of lower power consuming storage devices. Redundant storage devices can be placed into, or activated back out of, a reduced power consuming state based on established parameters, such as a quantity of write cycles or a user experienced latency, crossing established thresholds. Additionally, historical information, such as lifecycle information, that can have been collected in real-time by the storage devices on a block-by-block basis, can be referenced to identify and pre-set particular times during which redundant storage devices can be placed into, and activated back out of, a reduced power consuming state.

The techniques described herein focus on, but are not limited to, storage devices arranged to provide both parallelism and redundancy. To the contrary, the mechanisms described below are equally applicable to any arrangement of storage devices whereby some storage devices can be placed into a reduced power consuming state with a reduced throughput being the primary disadvantage of such an action. As a result, references below to particular arrangements of individual storage devices are meant to be exemplary only, and are not meant to limit the below descriptions to those specific arrangements or types of arrangements.

Although not required, the descriptions below will be in the general context of computer-executable instructions, such as program modules, being executed by one or more computing devices or dedicated storage-centric control devices or circuits integrated with one or more storage devices. More specifically, the descriptions will reference acts and symbolic representations of operations that are performed by one or more computing devices, dedicated storage-centric control devices, or circuits integrated with one or more storage devices, unless indicated otherwise. As such, it will be understood that such acts and operations include the manipulation by a processing unit of electrical signals representing data in a structured form. This manipulation transforms the data or maintains it at locations in memory, which reconfigures or otherwise alters the operation of the computing device, dedicated storage-centric control device, storage device, or other peripheral in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary computing device 100 is illustrated, which can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus or point-to-point architectures.

The computing device 100 also typically includes computer readable media, which can include any available media that can be accessed by computing device 100, either by obtaining data from, or providing data to, such computer readable media, and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates an operating system 134, other program modules 135, and program data 136.

The computing device 100 may also include, or otherwise be communicationally coupled with, other removable/non-removable, volatile/nonvolatile computer storage media. FIG. 1 illustrates multiple non-volatile storage devices 199 being communicationally coupled to the computing device 100 via multiple alternative communicational paths, shown in grey to illustrate them as alternatives. In one alternative embodiment, the computing device 100 can be communicationally coupled to the non-volatile storage devices 199 via a storage device interface 140 that is, in turn, connected to the system bus 121. By way of example only, the one or more non-volatile storage devices 199 can include storage devices 170, 180 and 190.

In the one alternative embodiment, the storage devices 170, 180 and 190 can comprise storage media 171, 181 and 191, respectively. The storage media 171, 181 and 191 can be magnetic-based storage media or solid-state based storage media, including storage media based on single-level cell (SLC) or multi-level cell (MLC) based solid-state technology. Other removable/non-removable, volatile/nonvolatile computer storage media and storage devices that can be used include, but are not limited to, FLASH memory cards, or other solid-state storage devices, including RAM disks, hard drives, magnetic tape cassettes, digital versatile disks, digital video tape and other sequential storage devices.

In another alternative embodiment, the storage devices 170, 180 and 190 can, in addition to the storage media 171, 181 and 191, respectively, further comprise processing units 172, 182 and 192, respectively, and instructions 173, 183 and 193, respectively, for controlling, at least in part, the operation of the processing units and, in turn, of the storage devices. As indicated, the processing units 172, 182 and 192 and the instructions 173, 183 and 193 are shown in FIG. 1 in gray to illustrate them as an alternative embodiment.

In yet another alternative embodiment, the computing device 100 can be communicationally coupled to the non-volatile storage devices 199 via a controller 159 that can be either a hardware device separate and external from the computing device 100, or can be an internally installed hardware device, such as an interface card. The controller 159 can be communicationally connected to the computing device 100 via a system bus interface 150 which can, in turn, be connected to the system bus 121 and, thereby to the other elements of the computing device, including the processing unit 120 and the system memory 130. In one embodiment, the controller 159 can itself comprise one or more processing units 152, instructions 153 for controlling, at least in part, the operation of the processing units and, thereby, the controller 159, and a controller bus 151 that couples various controller components including the instructions to the processing units. The controller bus 151 may be any of several types of bus structures including a memory bus or memory controller, a peripheral bus, and a local bus using any of a variety of bus or point-to-point architectures. The controller 159 can further comprise a controller bus interface 155 for communicationally coupling the controller to the computing device 100, and a storage device interface 154 for communicationally coupling the controller to the non-volatile storage devices 199. The controller bus interface 155 and the storage device interface 154 can be connected to the controller bus 151, as shown. As before, the controller 159 is shown in FIG. 1 in gray to illustrate it as an alternative embodiment.

The storage devices 170, 180 and 190, and their associated computer storage media 171, 181 and 191, respectively, discussed above and illustrated in FIG. 1, provide storage of computer readable instructions, data structures, program modules and other data for the computing device 100. In FIG. 1, for example, the storage devices 199 are illustrated as storing an operating system 144, other program modules 145, and program data 146. Note that these components can either be the same as or different from operating system 134, other program modules 135 and program data 136. Operating system 144, other program modules 145 and program data 146 are given different numbers here to illustrate that, at a minimum, they are different copies.

In addition to the above-described elements, the computing device 100 may operate in a networked environment using logical connections to one or more remote computers. For simplicity of illustration, the computing device 100 is shown in FIG. 1 to be connected to a network 169 that is not limited to any particular network or networking protocols. The logical connection depicted in FIG. 1 is a general network connection 161 that can be a local area network (LAN), a wide area network (WAN) or other network. The computing device 100 is connected to the general network connection 161 through a network interface or adapter 160 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 161. It will be appreciated that the network connections shown are exemplary and other means of establishing a communications link between computing devices may be used.

Figure 2:
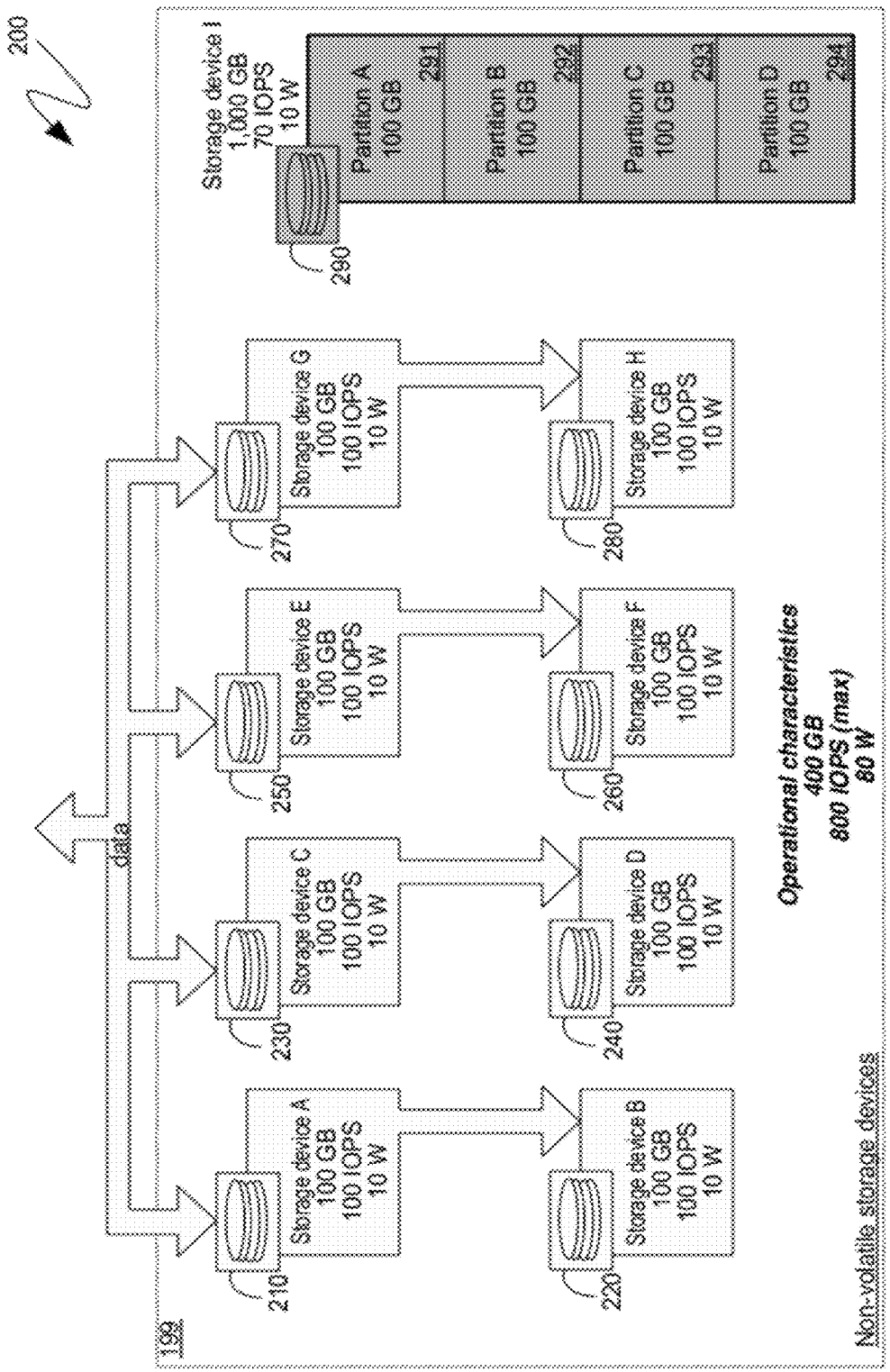
FIG. 2 is a block diagram of an exemplary storage system at a full operational state.

Turning to FIG. 2, an exemplary collection of non-volatile storage devices 199 is illustrated comprising storage devices 210, 220, 230, 240, 250, 260, 270, 280 and 290. As shown, the storage devices 199 can be arranged such that storage devices 210, 230, 250 and 270 operate in parallel and, thereby, aggregate their storage capacities for users of the system 200. Storage devices 220, 240, 260 and 280 can then be redundant storage devices that comprise redundant copies of the data stored by the storage devices 210, 230, 250 and 270, respectively. As will be recognized by those skilled in the art, the exemplary arrangement of the storage devices 210, 220, 230, 240, 250, 260, 270 and 280 is known as a RAID 10 or RAID 1+0 arrangement. The below described mechanisms, as will be shown, are also applicable to other Redundant Array of Inexpensive Disks (RAID) arrangements and can provide power efficiency benefits with such other RAID arrangements, or, indeed, any arrangement of storage devices whereby some storage devices can be placed into a reduced power consuming state with a reduced throughput being the primary disadvantage of such an action.

In the specifically illustrated system 200, the storage devices 210, 220, 230, 240, 250, 260, 270 and 280 can be operational and, thus, actively providing data that was stored on their storage media, and actively storing data on their storage media that was provided to them. Conversely, the storage device 290 can be in an inactive, reduced power consuming state in which it does not source or receive data, or at least does not source or receive as much data as it could if it were not in such a reduced power consuming state. To illustrate such a reduced power consuming state, the storage device 290 is shown in gray in FIG. 2.

For purposes of providing greater specificity to the below descriptions, and for illustrating the effects of the below described mechanisms, the storage devices 210, 220, 230, 240, 250, 260, 270, 280 and 290 have been assigned exemplary characteristics, including an exemplary storage capacity, an exemplary throughput capacity, and an exemplary power consumption. More specifically, storage devices 210, 220, 230, 240, 250, 260, 270 and 280 are indicated as each having, as an example only, a capacity of 100 GigaBytes (GB), a throughput of 100 Input/Output operations Per Second (IOPS) and a power consumption of 10 Watts (W). Storage device 290, on the other hand, is indicated as having, again as an example only, a capacity of 1,000 GB, a throughput of 70 IOPS, and a power consumption of 10 W. Such exemplary characteristics are in accordance with currently available storage device technology, which is utilized to produce either high throughput drives that have slightly reduced storage capacity or high capacity drives that have slightly lower throughput.

As can be deduced from the exemplary characteristics of the storage devices 210, 220, 230, 240, 250, 260, 270 and 280, the operational characteristics, as indicated in FIG. 2, of the system 200, are that the system 200 provides 400 GB of storage capacity, a maximum of 800 IOPS of throughput (such as when data is only being read from the system 200 in a round-robin manner) and consumes 80 W of power. Should a lower throughput provide acceptable performance, such as during periods of reduced storage activity, or such if the storage activity is attributable to sources that do not generate revenue or are not otherwise associated with service level agreements requiring a particular level of storage-related service, one or more of the redundant storage devices 220, 240, 260 and 280 can be placed into a reduced power consuming state, thereby enabling the storage devices 199 to continue to provide 400 GB of storage, with redundancy, while consuming less than the power of the system 200.

Figure 3:
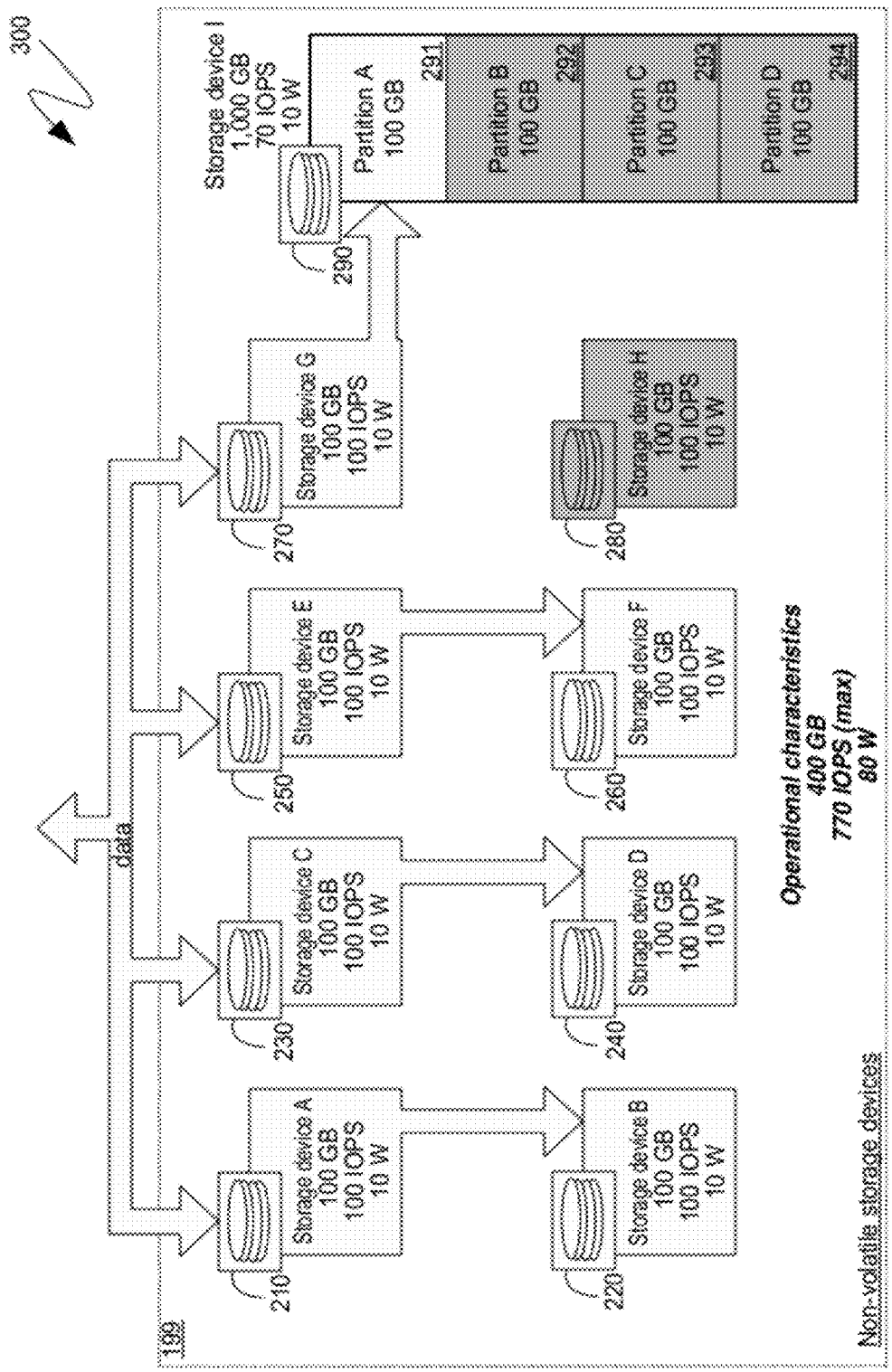
FIG. 3 is a block diagram of an exemplary storage system at a first level reduced-power consumption operational state.

Turning to FIG. 3, a system 300 is illustrated that can be a first level reduced power consuming system. In particular, as can be seen from FIG. 3, in the system 300, one of the redundant storage devices 220, 240, 260 and 280, namely the redundant storage device 280, can have been placed into a reduced power consuming state. Retaining the above indicated convention, such a storage device in a reduced power consuming state is shown in gray in FIG. 3.

To continue to provide equivalent redundancy for the storage capacity provided by the storage device 270, the larger capacity storage device 290 can be activated and can be partitioned such that at least one partition is sufficiently large to act as a redundant storage area for the data of the storage device 270. In the particular example shown in FIG. 3, the storage device 290 is shown as having been partitioned, or otherwise divided, into partitions 291, 292, 293 and 294 having an exemplary size of 100 GB. Thus, as shown in FIG. 3, in the first level reduced power consuming system 300, the redundancy of the data on the storage device 270 that was previously, such as in the system 200, provided by the redundant storage device 280 can now be provided, upon the placing of the redundant storage device 280 into a reduced power consuming state, by the larger storage device 290 and, more specifically, by at least one partition, or other division, of the larger storage device 290, such as the partition 291.

In one embodiment, upon a determination to transition from the full power consuming system 200 to the first level reduced power consuming system 300, a determination can be made if an available partition, such as the partition 291, of the storage device 290 has previously been utilized to provide redundancy for the storage device 270. If an available partition, such as the partition 291, of the storage device 290, has not previously been utilized to provide redundancy for the storage device 270, then, prior to placing the redundant storage device 280 into a reduced power consumption state, a copy of the data of the storage device 270 can be made to the partition 291. Once such a copy has completed, and the partition 291 can act as redundant storage for the data stored on the storage device 270, the redundant storage device 280 can be placed into a reduced power consuming state.

However, if an available partition of the storage device 290, such as the partition 291, has previously been utilized to provide redundancy for the storage device 270, then rather than copying all of the data from the storage device 270 to the partition 291, the copying can comprise only those data segments that have changed since the partition 291 was previously used to provide redundancy for the storage device 270. Such a determination can, in one embodiment, be based on lifecycle information, or any other information, on the partition 291 of the storage device 290 that can indicate when specific data segments on the partition 291 were last changed. For example, if the storage devices 270 and 290 were capable of including lifecycle information, or other information that can indicate when specific data segments were last changed, the lifecycle information associated with the data of the partition 291, which had previously comprised a copy of the data of the storage device 270, can be compared with the lifecycle information associated with the data currently stored by the storage device 270. From such a comparison, corresponding data segments on the partition 291 and the storage device 270 can be identified for which the lifecycle information indicates that a last change to the data segment on the storage device 270 is more recent than a last change to the corresponding data segment on the partition 291. Such data segments can then be copied from the storage device 270 to the partition 291. Conversely, if one data segment on the storage device 270 is associated with lifecycle information that indicates a last change of an identical time as that indicated by the lifecycle information associated with the corresponding data segment on the partition 291, then, for such data segments, no copy need be made as equivalent data to that stored on the storage device 270 is already stored on the partition 291. In such a manner, the copying of the data from the storage device 270 to the partition 291 for purposes of utilizing the partition 291 as a redundant storage to the storage device 270 can be rendered more efficient.

As can be seen from the first level reduced power consuming system 300, the substitution of a partition of the larger capacity storage device 290, such as the partition 291, for the redundant storage device 280 can cause a decrease in the throughput of the overall system. However, even if the larger capacity storage device 290 does not consume less power than the redundant storage device 280, as in the exemplary system 300 of FIG. 3, subsequent levels of reduced power consumption can be achieved that do, in fact, result in even greater power consumption reductions.

Figure 4:
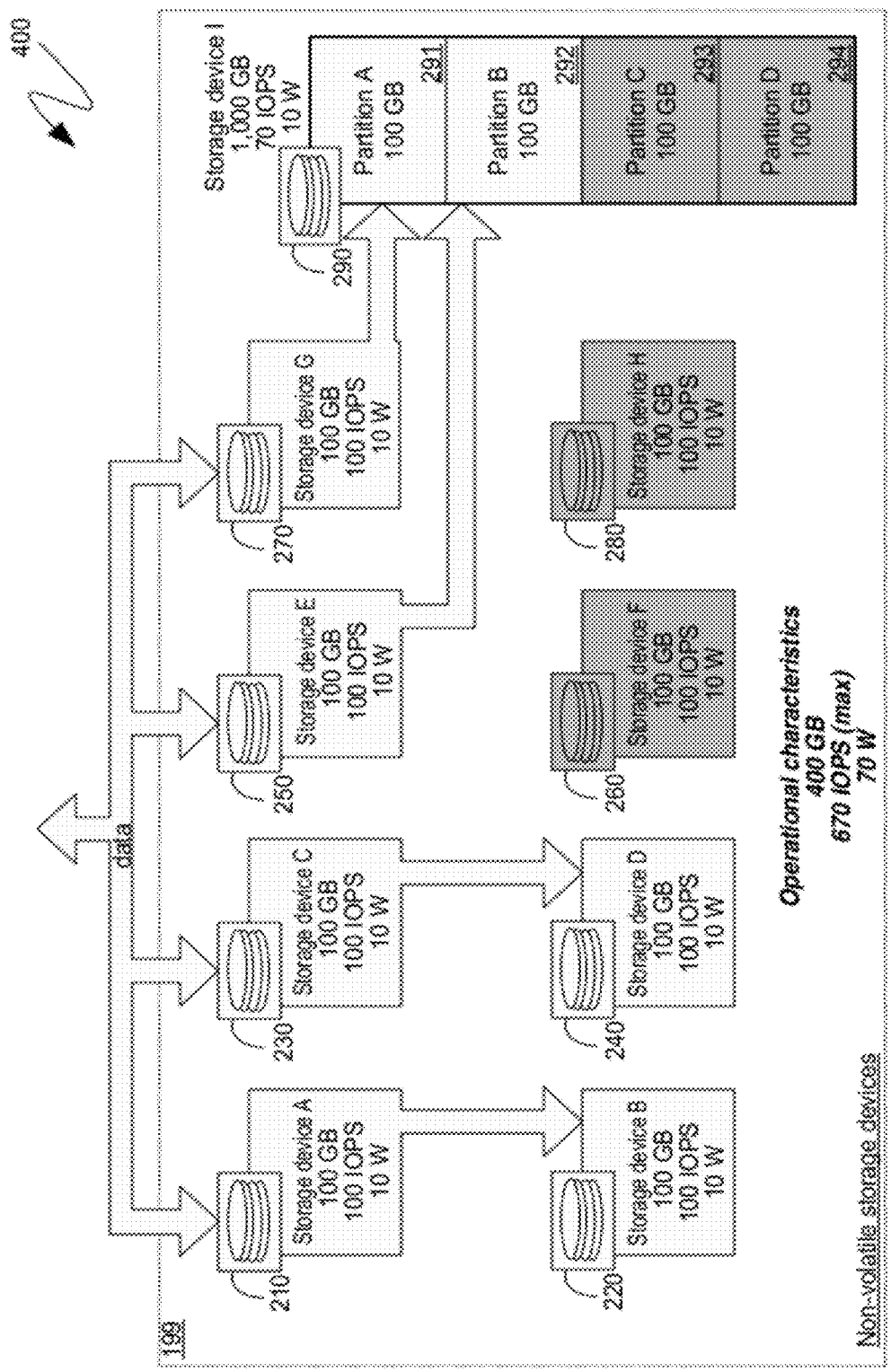
FIG. 4 is a block diagram of an exemplary storage system at a second level reduced-power consumption operational state.

More specifically, with reference to FIG. 4, a second level reduced power consuming system 400 is shown. As can be seen, in the second level reduced power consuming system 400, the redundant storage device 280 can remain in a reduced power consuming state while another redundant storage device, such as the redundant storage device 260, can also be placed into a reduced power consuming state. To maintain redundancy, another partition, or other division, of the larger capacity storage device 290, such as the partition 292, can be utilized in the place of the redundant storage device 260 to provide redundancy for the data stored by the storage device 250. As described above, prior to placing the redundant storage device 260 into a reduced power consumption state, such as that illustrated by the gray shading of FIG. 4, a copy of the data from the storage device 250 can be made to the partition 292 of the storage device 290. As also described above, if the partition 292 had previously acted as a redundant storage location for the data of the storage device 250, then not all of the data from the storage device 250 may need to be copied, since lifecycle information, or other such information, can be referenced to identify only those data segments that have changed since the partition 292 was last used as a redundant storage location for the data of the storage device 250, and then only those identified data segments can be copied. Once the partition 292 comprises a redundant copy of the data of the storage device 250, the redundant storage device 260 can be placed into a lower power consuming state.

As can be seen from the second level reduced power consuming system 400, a single storage device, such as the storage device 290, can be utilized to provide redundancy to multiple storage devices, such as the storage devices 250 and 270, thereby enabling multiple redundant storage devices, such as the redundant storage devices 260 and 280, to be placed into a reduced power consuming state. Unless the storage device 290 consumes more power than the aggregate of the redundant storage devices 260 and 280, a power savings will result from the second level reduced power consuming system 400. Thus, as shown, unlike the full power consuming system 200, which, given the characteristics assigned to the storage devices 199 for exemplary purposes only, consumed 80 W of power, the second level reduced power consuming system 400 of FIG. 4 consumes only 70 W of power. However, as will be recognized by those skilled in the art, while the storage capacity of the second level reduced power consuming system 400 remains the same as that of the full power consuming system 200, the placing of multiple storage devices into a reduced power consuming state can affect the throughput of the second level reduced power consuming system 400. Referencing the characteristics assigned to the storage devices 199 for exemplary purposes only, the second level reduced power consuming system 400 is capable of a maximum of 670 IOPS, while the full power consuming system 200 was capable of a maximum of 800 IOPS. However, should a reduced level of storage activity be experienced, for which a maximum throughput of 670 IOPS was as sufficient as a maximum throughput of 800 IOPS, the second level reduced power consuming system 400 of FIG. 4 can provide a reduced power consumption without impacting the consumers of the storage provided by the storage devices 199.

Subsequent levels of reduced power consumption can be achieved by continuing to shift redundant data responsibilities to one or more partitions, or other divisions, of larger storage devices, such as the storage device 290, while placing the redundant storage devices that had previously maintained such redundant data responsibilities, such as the redundant storage devices 260 and 280, into reduced power consuming states. For example, turning to FIG. 5, a third level reduced power consuming system 500 is shown within which another redundant storage device, specifically the redundant storage device 240, can be placed into a reduced power consuming state, while the redundancy responsibilities provided by such a storage device can be assigned to another partition, such as the partition 293, of a larger capacity storage device, such as the storage device 290. As before, prior to the placing of the redundant storage device 240 into a reduced power consuming state, the partition 293 can be provided with a copy of the data of the storage device 230, which, as also described previously, can be performed in a more efficient manner if the partition 293 had previously been utilized as redundant storage for the data of the storage device 230 since, in such a case, the only data segments that need to be copied can be those data segments that have changed since the partition 293 was last utilized for such redundant storage.

Figure 5:
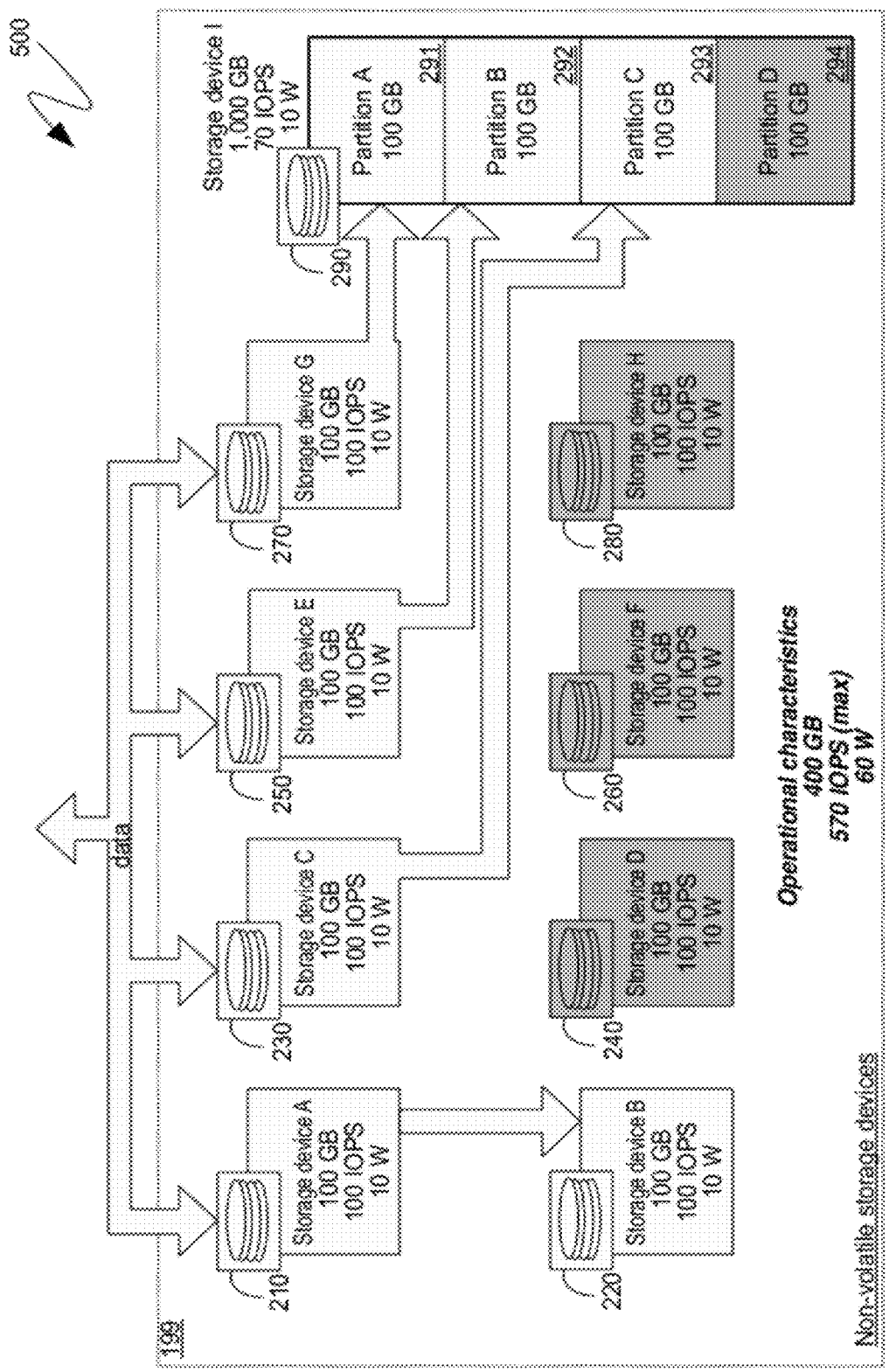
FIG. 5 is a block diagram of an exemplary storage system at a third level reduced-power consumption operational state.

By placing another redundant storage device, such as the redundant storage device 240, into a reduced power consuming state, and shifting the redundancy responsibilities of such a redundant storage device to a partition, or other division, of a storage device that is already being utilized, such as the larger capacity storage device 290, the overall power consumption of the storage devices 199 can be decreased by an amount approximately, or exactly, equal to the power consumption of the redundant storage device that was placed into the reduced power consuming state. Thus, as shown in FIG. 5, the storage devices 199, which were assigned characteristic values as examples only, can now consume 60 W of power while providing a maximum throughput of 570 IOPS. In comparison to the second level reduced power consuming system 400 of FIG. 4, the third level reduced power consuming system 500 of FIG. 5 can consume 10 W less power at a cost of 100 IOPS of maximum throughput. As will be shown, however, if the storage activity is such that the reduced throughput is sufficient, then the storage devices 199 can consume less power, while still providing adequate storage services, by being arranged in the manner shown by the third level reduced power consuming system 500.

Figure 6:
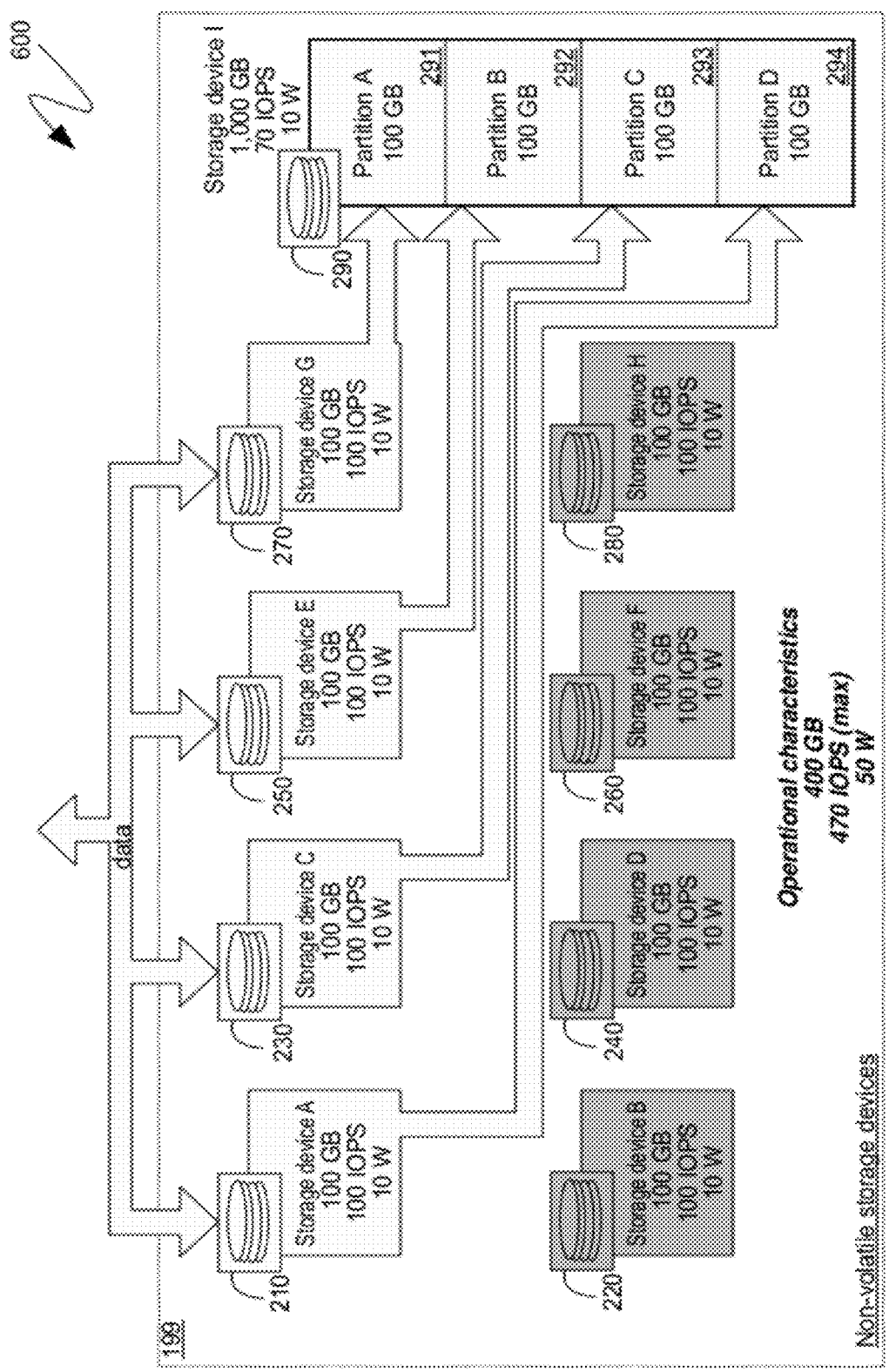
FIG. 6 is a block diagram of an exemplary storage system at a fourth level reduced-power consumption operational state.

For purposes of completing the example, a fourth level reduced power consuming system 600 is shown in FIG. 6. As can be seen, in the fourth level reduced power consuming system 600, all of the redundant storage devices 220, 240, 260 and 280 of the exemplary set of storage devices 199 can be placed into a reduced power consuming state while the redundant data responsibilities provided by such redundant storage devices can be shifted to partitions, or other divisions, of one or more larger capacity storage devices, or lower power consumption storage devices, such as the storage device 290. As before, prior to the placing of the redundant storage device 220 into the reduced power consuming state, the partition 294 being utilized to provide redundancy for the storage device 210 can be provided with a copy of the data of the storage device 210. Also as before, the placing of the redundant storage device 220 into the reduced power consuming state can again reduce the overall power consumption of the storage devices 199 in aggregate, at the cost of maximum throughput.

Although not specifically illustrated, transitions from levels of greater reductions in power consumption to levels of less reductions in power consumption, or even to a full power level, can occur in an analogous manner to that described above. More specifically, prior to the restoring of a redundant storage device as the provider of redundant storage, a comparison can be made between the data on the redundant storage device that was previously in the reduced power consuming state, and the data of the associated storage device that was retained in a fully active state. Those data segments that have changed on the storage device that was retained in a fully active state while the redundant storage device was in the reduced power consuming state can be copied to the redundant storage device. Subsequently, utilization of the alternative for the redundant storage device, such as a partition on a larger capacity storage device, can be stopped, and the redundant storage device can again be utilized to provide data redundancy.

For example, should a transition from the fourth level reduced power consuming system 600 to the third level reduced power consuming system 500 be performed, the data of the storage device 210 can be compared to the data of the redundant storage device 220 once the redundant storage device 220 is fully active. The data that had changed on the storage device 210 since the redundant storage device 220 was placed into the reduced power consuming state, can be copied to the redundant storage device 220 from the storage device 210. Subsequently, utilization of the partition 294 can be stopped and the redundant storage device 220 can provide the redundancy for the data of the storage device 210. As before, such a comparison of the changed data between the storage device 210 and the redundant storage device 220 can be performed with reference to lifecycle information, or other like information, that can identify when a data segment was last changed.

Subsequent transitions between, for example, the fourth level reduced power consuming system 600 and the third level reduced power consuming system 500 can then be made more efficiently, since, as described above, the partition 294 can already comprise a substantial portion of the data of the storage device 210, such that subsequent transitions from the third level reduced power consuming system 500 to the fourth level reduced power consuming system 600 can comprise only the copying, from the storage device 210 to the partition 294, of the data that has changed since the partition 294 was last utilized as a redundant storage device for the storage device 210.

As will be recognized by those skilled in the art, in a RAID 10 arrangement, such as that illustrated in FIGS. 2 through 6, the number of levels of reduced power consumption that can be achieved can be equivalent to the quantity of parallel redundant storage devices. Thus, in the present example, because the exemplary RAID 10 arrangement of the storage devices 210, 220, 230, 240, 250, 260, 270 and 280 comprises four parallel redundant storage devices, namely redundant storage devices 220, 240, 260 and 280, such an exemplary RAID 10 system can achieve four levels of reduced power consumption, as illustrated by systems 300, 400, 500 and 600.

Other RAID arrangements can likewise benefit from the above-described mechanisms. For example, a RAID 6 arrangement can, as will be known by those skilled in the art, provide for two parity storage devices. The placing of one such parity storage device into a reduced power consuming state can still leave the overall RAID system protected from at least one storage device failure, though at a cost of reduced throughput, analogous to the reduced throughput described above. Should additional throughput be required, the storage device in the reduced power consuming state can be reactivated to a full power consuming, and full operational, state. As described above, such a reactivation can be accompanied by an examination of the data on the previously not fully active storage device as compared with the data stored on the storage devices that have remained fully active. Again, lifecycle information, or other like information, can be referenced to identify those data segments on the previously not fully active storage device that need to be updated. For example, in the case of a double parity set of a RAID 6, the newly calculated blocks can be rewritten only on the stripes that have been modified.

As indicated previously, the above descriptions are applicable to any arrangement of storage devices whereby the placing of any one or more storage devices into a reduced power consuming state can reduce the overall power consumption of the arrangement of storage devices at a cost of reducing a throughput of the arrangement of storage devices. In arrangements where multiple redundancy is provided for, such as a RAID 6 arrangement, no additional storage device need be activated upon the placing of one or more active storage devices into a reduced power consuming state, since multiple redundancy was already provided for. Alternatively, in arrangements where only a single level of redundancy is provided for, such as the illustrated RAID 10 arrangement, another storage device can be utilized in place of the redundant storage device that was placed into the reduced power consuming state. While the storage devices 199, described above, obtained power consumption reductions through the use of multiple partitions of a single larger storage device, namely the storage device 290, similar power consumption reductions could have been achieved through the use of multiple low-power consuming storage devices without partitions, since, in aggregate, such multiple low-power consuming storage devices may not consume more power than a single larger capacity storage device. Traditionally, however, such low-power consuming storage devices do not provide high throughput, again maintaining the power consumption versus throughput tradeoff referenced above.

Figure 7:
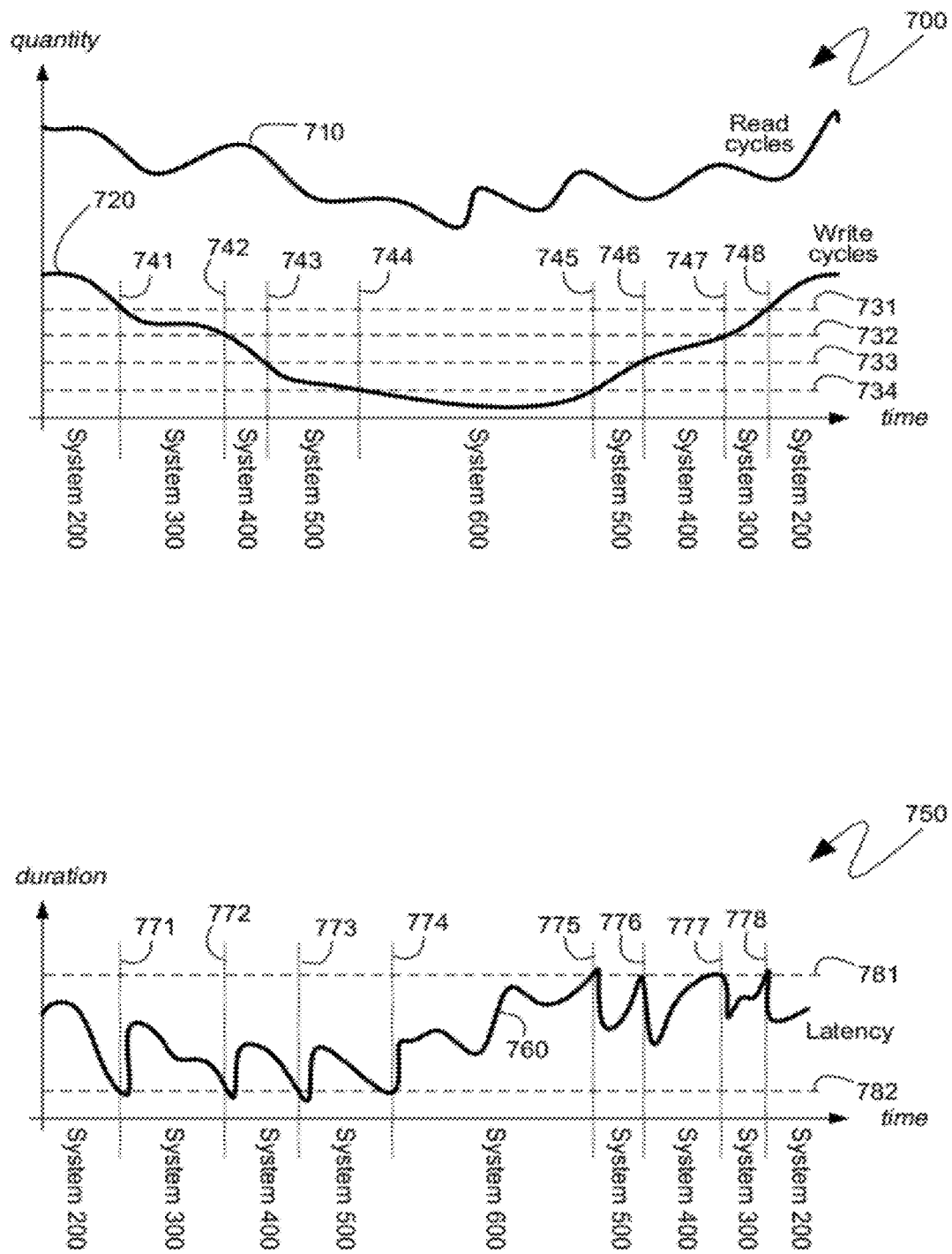
FIG. 7 are graph diagrams of an exemplary establishment and utilization of threshold values of various parameters.

Turning to FIG. 7, two graphs 700 and 750 provide illustrative examples of determinations, according to some embodiments, of when to transition between states. As indicated previously, the transition between states can be based on established parameters crossing predetermined thresholds. In one embodiment, illustrated with reference to the graph 700, a current quantity of write cycles requested of an arrangement of storage devices can be utilized as a basis for determining when to transition the arrangement of storage devices between specific states, including reduced power consuming states. To provide more concrete examples, the systems 200, 300, 400, 500 and 600 of FIGS. 2 through 6 are referenced in the graphs 700 and 750, though, as previously described, the described mechanisms are applicable to many types of arrangements of storage devices, and are not limited to the arrangements specifically illustrated.

Turning to the graph 700, the quantity of read cycles and write cycles at any given time is illustrated by the read cycles line 710 and the write cycles line 720. As will be recognized by those skilled in the art, in some arrangements of storage devices where data redundancy is provided, a request to read data can be responded to, and the data provided by, multiple different storage devices, since, due to the redundancy, multiple different storage devices can each comprise the requested data. As such, the storage activity associated with read requests can be shared among multiple storage devices. Conversely, requests to write data, in such storage device arrangements, can require that each storage device that maintains a copy of the relevant data perform the requested write so as to maintain redundancy and, as such, write requests can be more burdensome. Thus, in one embodiment, the quantity of write requests at a given time can be a parameter that can be monitored for determining when to transition between power saving states.

The quantity of read and write requests illustrated in the graph 700 are meant as an example only, to better describe the transition between power saving states that can be triggered based upon one or more predetermined parameters crossing predetermined thresholds, and are not meant to illustrate any inherent aspect of any of the described mechanisms or underlying systems. In the example illustrated by write cycle line 720 in the graph 700, the quantity of write cycles at a given time can initially decline and then subsequently increase. Up until time 741, as indicated in the graph 700, the quantity of writes directed at the storage devices 199 can be above a first threshold 731. At time 741, however, the quantity of writes can decrease below that first threshold 731. As a result, in one embodiment, the decrease of a parameter, such as the quantity of write cycles, below a threshold, such as the first threshold 731, can trigger a transition from one state to another. In particular, as shown in the graph 700, the storage devices 199 can have been operating in accordance with the full power system 200 prior to time 741 and, at time 741, when the write cycles drop below the first threshold 731, the storage devices 199 can be transitioned to the first level reduced power consuming system 300.

A subsequent reduction of the write cycles below further thresholds can result in further transitions to even more reduced power consuming states. For example, as shown in the graph 700, when the write cycles drop below a second threshold 732, at time 742, a transition from the first level reduced power consuming system 300 to the second level reduced power consuming system 400 can occur. Similarly, as write cycles continue to decline below lower thresholds 733 and 734, such as at times 743 and 744, respectively, further transitions from the second level reduced power consuming system 400 to the third level reduced power consuming system 500, and from the third level reduced power consuming system 500 to the fourth level reduced power consuming system 600, respectively, can be performed. Thus, as can be seen from the graph 700, as a particular parameter, such as the quantity of write cycles, decreased and crossed successively lower thresholds, the storage devices 199 can be transitioned to ever more power saving systems. As indicated previously, one primary drawback of such power saving systems is their reduced throughput. However, since the triggering parameter, such as the write cycles of the graph 700, can be associated with throughput, the resulting reduced throughput of various power saving states can be aligned with periods of reduced requirements, as shown.

Should the triggering parameter be associated with an increased request for throughput, successively less power saving systems can be transitioned to. Thus, as shown in the graph 700, as the write cycles increase above the threshold 734, at time 745, the storage devices 199 can be transitioned from the fourth level reduced power consuming system 600 to the third level reduced power consuming system 500. Similarly, as the write cycles increase above the threshold 733, at time 746, the storage devices 199 can be transitioned from the third level reduced power consuming system 500 to the second level reduced power consuming system 400. Like transitions can occur at times 747 and 748, from the second level reduced power consuming system 400 to the first level reduced power consuming system 300 and from the first level reduced power consuming system 300 to the full power system 200, respectively, as the write cycles increase through the thresholds 732 and 731.

In another embodiment, parameters that can trigger a transition between power consuming states can be associated with a user experience that is impacted by the throughput of the storage devices 199. For example, the graph 750 illustrates a latency line 760 that corresponds to the latency experienced by a user, such as an application, of the storage services provided by the storage devices 199. With such a parameter, often a mere two thresholds can be sufficient: an upper threshold that reflects a maximum acceptable value before a current state should be transitioned to another state, if one remains, and a lower threshold that reflects a minimum acceptable value before a current sate should be transitioned to another state, again, if one remains. For example, in the graph 750, the upper threshold 781 can reflect a maximum latency that should be allowed before transitioning to a system with more throughput, if such a system exists, while the lower threshold 782 can reflect a minimum latency that should be allowed before transitioning to a system with greater power savings, should such a system exist.

As before, the latency values illustrated by the latency line 760 are examples only meant for clarity of illustration, and not as an indication of an inherent characteristic of systems to which the described mechanisms are applicable. In the example of the graph 750, the latency can decrease below the lower threshold 782 at time 771, which can cause a transition from the full power system 200 to the first level reduced power consuming system 300 that can provide a reduced throughput with greater power efficiency. As will be known by those skilled in the art, such a transition can result in an increase in latency, as reflected by the latency line 760 of the graph 750.

Should the latency continue to decrease, and again cross the lower threshold 782, such as illustrated in the graph 750 at time 772, another transition can be triggered, such as from the first level reduced power consuming system 300 to the second level reduced power consuming system 400, to render the system more power efficient while maintaining appropriate parameters, such as latency, within an acceptable band. Again, as before, due to the decreased throughput of the second level reduced power consuming system 400, the latency can increase after the transition to such a system at time 772. Further subsequent decreases in latency, such as those shown in the graph 750, that cross the lower threshold 782, such as at times 773 and 774, can, likewise, result in transitions to lower power consuming states. Thus, as shown, at time 773, a transition from the second level reduced power consuming system 400 to the third level reduced power consuming system 500 can be triggered and, likewise, at time 774, a transition from the third level reduced power consuming system 500 to the fourth level reduced power consuming system 600 can be triggered.

Increases in the exemplary latency of the graph 750 can, analogously, trigger state transitions to states with higher throughput. Thus, for example, if the latency, as shown by the latency line 760 in the graph 750, increases above the upper threshold 781, such as at time 775, a transition can be made from the fourth level reduced power consuming system 600, which was operational from time 774 to time 775, to the third level reduced power consuming system 500, as shown. Again, in an analogous manner to that described above, the increased throughput of the third level reduced power consuming system 500, as compared to the fourth level reduced power consuming system 600, can result in a drop in the latency after time 775, as shown. However, should the latency continue to increase and cross the upper threshold 781, subsequent transitions to states with higher throughput, and less power efficiency, can be made. Thus, as shown, as the latency line 760 crosses the upper threshold 781 at times 776, 777 and 778, transitions from the third level reduced power consuming system 500 to the second level reduced power consuming system 400, and then further to the first level reduced power consuming system 300 and, ultimately, the full power system 200, can be made. In each case, as before, such a transition can be accompanied by at least a temporary drop in the latency, as additional throughput is activated.

Thresholds, such as the thresholds 731, 732, 733 and 734, or upper and lower thresholds, such as the upper threshold 781 and the lower threshold 782, can be selected based on a variety of factors. For example, if the storage devices 199 are primarily utilized to support non-fee services, such as free network forums, chat rooms or other such services, then power savings may more be beneficial than any attendant decrease in storage performance is harmful and thresholds can be set accordingly. Alternatively, if the storage devices 199 are primarily used to support fee-based services, especially services that can be sensitive to storage performance, such as video or audio services, then storage performance can be more important than power savings and thresholds can be set accordingly.

While the above descriptions reference a single parameter, such as write cycles or latency, such references were made strictly for ease of presentation. In other embodiments, combinations of parameters can be utilized, such as with different weightings, or with independently settable per-parameter thresholds. In such embodiments, determinations as to when to transition between states can be made based on multiple parameters and their values.

In yet another embodiment, pre-set times can be established for the transitioning among power saving states. More specifically, data can be collected that can provide a historical basis for identifying particular times when transitions between states would, as a general rule, be appropriate. Such identified particular times are, thereby, "pre-set", and subsequently implemented by the storage devices, such as in the manner described above. As will be known by those skilled in the art, a historical examination of relevant factors can reveal predictable, and repetitive, variances. For example, storage services provided to a world-wide set of users can experience increased usage during those times that correspond to daylight in major metropolitan areas, and can experience decreased usage during those times that correspond to daylight across portions of the Pacific Ocean. In addition to usage, other relevant factors, such as the cost of power, can, likewise, vary on relatively predictable 24-hour cycles, or other repeatable cycles. Such predictable cycles can be analyzed, and pre-set times for transitioning among power saving states can be established. However, in one embodiment, even if a pre-set time was established, if the storage activity indicates, such as through predetermined parameters exceeding specified thresholds, that a transition is inappropriate, or that it should be undone, then such a transition can, indeed, either not be performed, or be undone, so as to maintain an acceptable level of storage performance.

Figure 8:
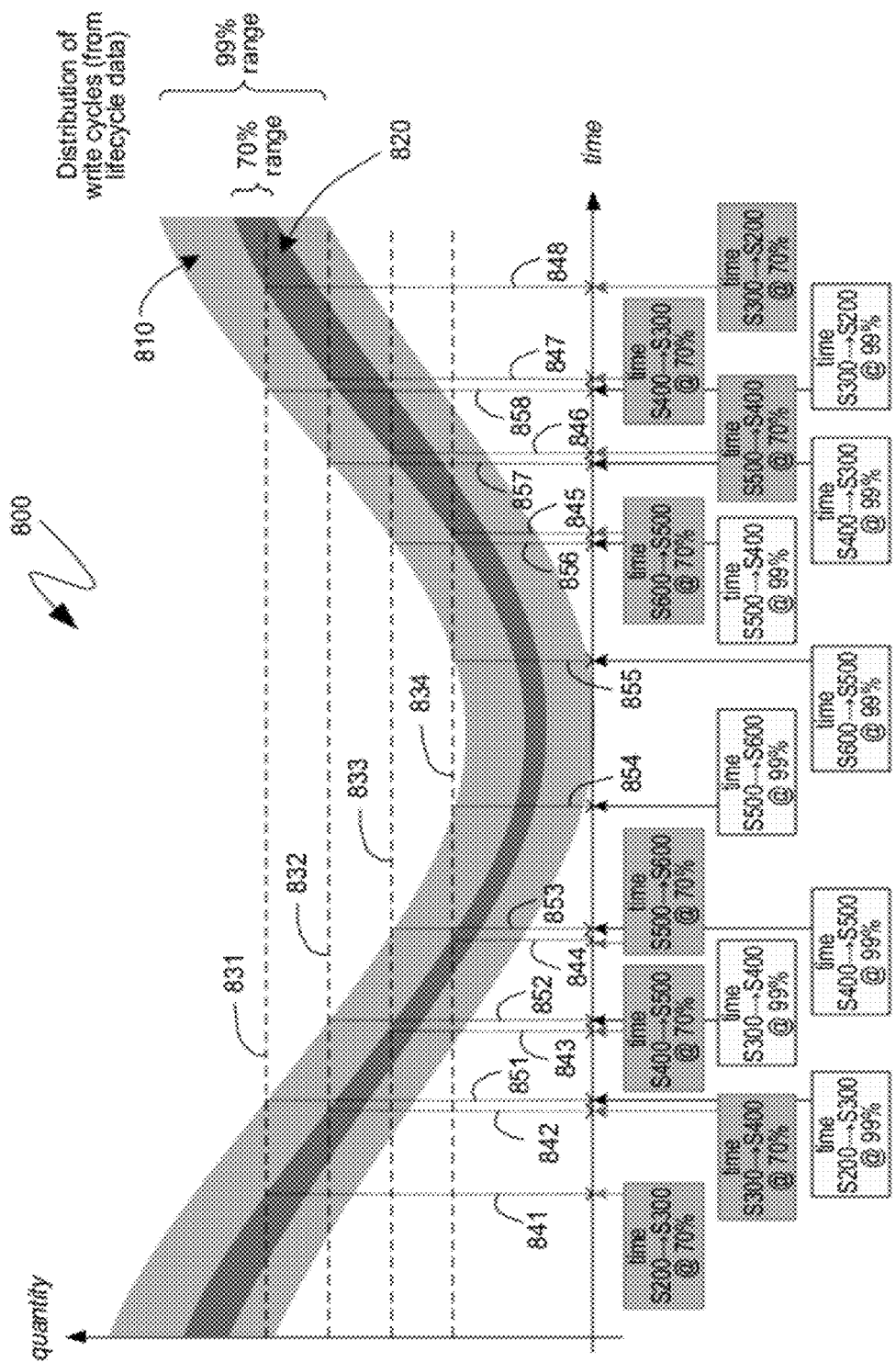
FIG. 8 is a graph diagram of an exemplary establishment of pre-set times for the transition among operational states.

Turning to FIG. 8, an exemplary establishing of pre-set transition times is described with reference to the graph 800. In one embodiment, repetitive variances associated with the utilization of the storage devices 199 can be determined and analyzed based on historical empirical data. Such empirical data can be collected by applications, operating system components, device drivers or the storage devices themselves. For example, such empirical data can be based on, or derived from, lifecycle information, or other such information that can be maintained and that can provide information regarding the time when specific data segments were accessed or modified. As indicated, lifecycle information can be collected in a real-time manner by storage devices, indicating, on a per-block basis, when those blocks were accessed or modified. Collecting such lifecycle information across many, or all, of the relevant data segments, such as storage blocks, can enable an analysis of historical patterns of the utilization of storage-related services. For example, as shown in the graph 800, such lifecycle information can be referenced to identify a historical range of the quantity of write cycles at a given time of day. As will be known by those skilled in the art, such historical data is likely to be have a range of variance and, consequently, as shown in the example of the graph 800, a 70% range 820, encompassing 70% of the historical write cycles, can be a narrower range than a 99% range 810 that can encompass 99% of the historical write cycles.

As before, thresholds, such as the thresholds 831, 832, 833 and 834, can be established for the parameters whose empirical data was collected. Pre-set times for transitioning among power saving states can then be established based on when a historically-derived range crosses a threshold. For example, utilizing the write cycle data of the graph 800, which is provided as an example only, and is not meant to describe any inherent characteristic of systems associated with the described methodology, specific pre-set times for various state transitions can be established based on when either the 70% range 820 or the 99% range 810 crosses the thresholds 831, 832, 833 and 834.

Referring first to the 70% range 820, as can be seen from the graph 800, at time 841, at least 70% of the historical quantity of write cycles at that time 841 will be below the threshold 831. Consequently, if the 70% range 820 was being utilized as an appropriate parameter, a pre-set time for transitioning from the full power system 200 to the first level reduced power consuming system 300 can be established at time 841. Likewise, at time 842, 70% of the historical write cycles at that time 842 can be found to be below the threshold amount 832. Consequently, the time 842 can be established as a pre-set time from which to transition from the first level reduced power consuming system 300, to the second level reduced power consuming system 400. Similar pre-set times for transitioning from the second level reduced power consuming system 400 to the third level reduced power consuming system 500, and for transitioning from the third level reduced power consuming system 500 to the fourth level reduced power consuming system 600, can be established at times 843 and 844, respectively.

Pre-set times for transitioning to states that provide more throughput can be established in a similar manner with reference to increasing historical trends. Thus, in the example of graph 800, after the time 845 less than 70% of the historical write cycles will be below the threshold 834 and, as a result, the time 845 can be established as a pre-set time to transition from the fourth level reduced power consuming system 600 to the third level reduced power consuming system 500. Likewise, times 846, 847 and 848 can, for analogous reasons, be established as the pre-set times for, respectively, transitioning from the third level reduced power consuming system 500 to the second level reduced power consuming system 400, and then to the first level reduced power consuming system 300, and, ultimately, to a full power system 200.

Should it be desirable to establish the pre-set times based on a 99% range 810, a similar methodology can be followed to establish times 851, 852, 853 and 854 as the pre-set times for transitioning from the full power system 200, to a first level reduced power consuming system 300, then to a second level reduced power consuming system 400, then to a third level reduced power consuming system 500, and, finally, to a fourth level reduced power consuming system 600. Similarly, times 855, 856, 857 and 858 can be established as pre-set times for transitioning back from the fourth level reduced power consuming system 600 to the third level reduced power consuming system 500, then to the second level reduced power consuming system 400, then to the first level reduced power consuming system 300, and, finally, to the full power system 200.

Figure 9:
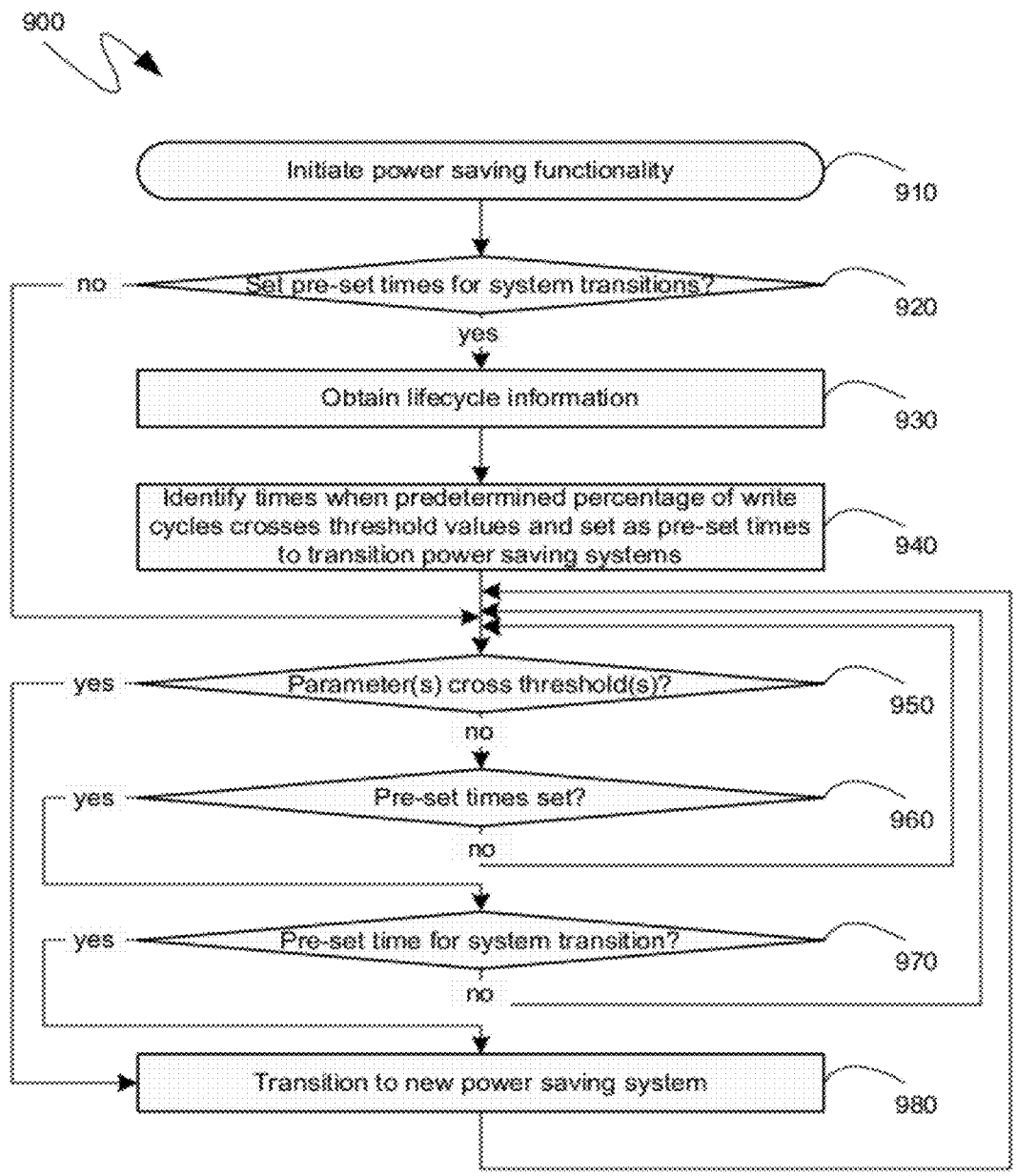
FIG. 9 is a flow diagram of an exemplary transition among operational states for power efficiency.

The above-described establishment of pre-set times, as well as the utilization of parameters and thresholds for transitioning among power saving states in a multi-device storage system is further described with reference to the flow diagram 900 of FIG. 9. Turning to FIG. 9, the flow diagram 900 can commence with the initiation of power saving functionality at step 910. In one embodiment, such an initiation at step 910 can coincide with the powering on, or resetting, of the computing device 100, controller 159, or one or more of the storage devices 199. Subsequently, at step 920, a determination can be made regarding the establishing of pre-set times for transitions between systems. If no such pre-set times are to be established or utilized, processing can skip to step 950 and proceed as described below.

Alternatively, if, at step 920, it is determined to establish pre-set times for system transitions, then, at step 930, lifecycle information, or other historical information, can be obtained from which historical parameter values can be derived. Subsequently, at step 940, pre-set times for transitioning between various systems comprising differing levels of power savings can be established, such as in the manner described in detail above with reference to FIG. 8. Once such pre-set times are established, processing can proceed with step 950.

At step 950, a determination can be made if monitored parameters upon which transition decisions are at least partially based have crossed one or more thresholds. For example, as described in detail above with reference to FIG. 7, if a quantity of write cycles crossed a predetermined threshold level, or if a latency crossed a upper or lower threshold level, then the determination at step 950 could find that such thresholds were, in fact, crossed, and a transition to a new power saving system can be made at step 980. The transition to a new power saving system can comprise the placing of at least one storage device into a reduced power consuming state, or the reactivation of at least one storage device that was previously in a reduced power consuming state. In addition, in some embodiments, the transition to a new power saving system can comprise the establishment, or reestablishment, of a new redundant storage device or partition of a storage device, such as in the manner described in detail above with reference to FIGS. 2 through 6. After completing step 980, processing can return to step 950 as shown.

If, at step 950, no parameters are found to have crossed thresholds, processing can proceed with the determination at step 960, which can seek to determine if pre-set transition times were established. If such times were not established, then step 970 can be skipped and processing can return to step 950, thereby looping until one or more parameters crosses one or more thresholds. However, if such times were established, as determined at step 960, then processing can proceed with the determination at step 970 which can check if such times have been reached. If, as determined at step 970, a pre-set transition time has not yet been reached, then processing can return to step 950 and, in such a manner, loop until either one or more parameters cross one or more thresholds, or until a pre-set time for transitioning among power saving systems is reached. However, if, at step 970, a pre-set time is reached, then, at step 980, a transition to a new power saving system, such as in the manner described in detail above, can be performed and processing can, as before, loop back to step 950.

As can be seen from the above descriptions, mechanisms for transitioning multi-device storage systems to less power consuming system architectures have been provided. In view of the many possible variations of the subject matter described herein, we claim as our invention all such embodiments as may come within the scope of the following claims and equivalents thereto.

We claim:

1. A processing unit with instructions for managing a power consumption of a storage system, wherein processing of the instructions by the processing unit causes the processing unit to perform steps comprising:
    activating at least one storage device of the storage system from a reduced power consuming state in response to a determination that a first parameter has crossed a first threshold, thereby indicating an increase in storage activity of the storage system, or in response to a pre-set transition time for activating the at least one storage device, the activated at least one storage device having previously comprised data redundant to data of at least one other storage device of the storage system that has remained in an active state while the at least one storage device that is being activated was in the reduced power consuming state;
    storing data on the activated at least one storage device reflective of changes to data stored on the at least one other storage device since the at least one storage device that is being activated was last placed into the reduced power consuming state, the storing being performed with reference to lifecycle information associated with data stored on either of the at least one other storage device that has remained in the active state or one or more reduced power consuming storage devices of the storage system to which data of the at least one storage device that is being activated was copied before the at least one storage device that is being activated was last placed into the reduced power consuming state;
    deactivating at least one storage device of the storage system to the reduced power consuming state in response to a determination that a second parameter has crossed a second threshold, thereby indicating a decrease in the storage activity, or in response to a pre-set transition time for deactivating the at least one storage device, the deactivated at least one storage device comprising data redundant to data of at least one other storage device of the storage system that will remain in an active state while the at least one storage device that is deactivated remains in the reduced power consuming state; and
    copying data from the at least one storage device that is being deactivated, prior to its deactivation, to the one or more reduced power consuming storage devices of the storage system, the one or more reduced power consuming storage devices comprising data from additional storage devices that have also been placed into the reduced power consuming state;
    wherein the pre-set transition time for activating the at least one storage device and the pre-set transition time for deactivating the at least one storage device were set based on historical empirical information of storage activity derived from the lifecycle information; and
    wherein further the first threshold is associated with a minimum acceptable user experience of one or more users utilizing the storage system.

2. The processing unit of claim 1, wherein the copying the data from the at least one storage device that is being deactivated to the one or more reduced power consuming storage devices comprises identifying data segments already stored on the one or more reduced power consuming storage devices that are equivalent to data segments on the at least one storage device that is being deactivated, and omitting the identified data segments from the copying of the data from the at least one storage device that is being deactivated to the one or more reduced power consuming storage devices; and wherein further the copying the data from the one or more reduced power consuming storage devices to the at least one storage device that is being activated comprises identifying data segments already stored on the at least one storage device that is being activated that are equivalent to data segments on the one or more reduced power consuming storage devices, and omitting the identified data segments from the copying of the data from the one or more reduced power consuming storage devices to the at least one storage device that is being activated.

3. The processing unit of claim 1, wherein the processing of the instructions by the processing unit causes the processing unit to perform further steps comprising:
    activating at least one additional storage device of the storage system from the reduced power consuming state to the active state in response to a determination that a third parameter has crossed a third threshold, greater than the first threshold, thereby indicating a further increase in the storage activity of the storage system, or in response to a pre-set transition time for activity the at least one additional storage device; and deactivating at least one additional storage device of the storage system to the reduced power consuming state in response to a determination that a fourth parameter has crossed a fourth threshold, less than the second threshold, thereby indicating a further decrease in storage activity of the storage system, or in response to a pre-set transition time for deactivating the at least one additional storage device.

4. The processing unit of claim 1, wherein the pre-set transition time for activating the at least one storage device is set such that the historical empirical information of storage activity derived from the lifecycle information reveals storage activity that is above the first threshold a predefined percentage of the time and wherein the pre-set transition time for deactivating the at least one storage device is set such that the historical empirical information of storage activity derived from the lifecycle information reveals storage activity that is below the second threshold the predefined percentage of the time.

5. A method for managing a power consumption of a storage system comprising the steps of:
    activating at least one storage device of the storage system from a reduced power consuming state in response to a determination that a first parameter has crossed a first threshold, thereby indicating an increase in storage activity of the storage system, or in response to a pre-set transition time for activating the at least one storage device, the activated at least one storage device having previously comprised data redundant to data of at least one other storage device of the storage system that has remained in an active state while the at least one storage device that is being activated was in the reduced power consuming state;

storing data on the activated at least one storage device reflective of changes to data stored on the at least one other storage device since the at least one storage device that is being activated was last placed into the reduced power consuming state, the storing is being performed with reference to lifecycle information associated with data stored on either of the at least one other storage device that has remained in the active state or one or more reduced power consuming storage devices of the storage system to which data of the at least one storage device that is being activated was copied before the at least one storage device that is being activated was last placed into the reduced power consuming state;

deactivating at least one storage device of the storage system to the reduced power consuming state in response to a determination that a second parameter has crossed a second threshold, thereby indicating a decrease in the storage activity, or in response to a pre-set transition time for deactivating the at least one storage device, the deactivated at least one storage device comprising data redundant to data of at least one other storage device of the storage system that will remain in an active state while the at least one storage device that is deactivated remains in the reduced power consuming state; and copying data from the at least one storage device that is being deactivated, prior to its deactivation, to the one or more reduced power consuming storage devices of the storage system, the one or more reduced power consuming storage devices comprising data from additional storage devices that have also been placed into the reduced power consuming state;

wherein the pre-set transition time for activating the at least one storage device and the pre-set transition time for deactivating the at least one storage device were set based on historical empirical information of storage activity derived from the lifecycle information; and wherein further the first threshold is associated with a minimum acceptable user experience of one or more users utilizing the storage system.

6. The method of claim 5, wherein the copying the data from the at least one storage device that is being deactivated to the one or more reduced power consuming storage devices comprises identifying data segments already stored on the one or more reduced power consuming storage devices that are equivalent to data segments on the at least one storage device that is being deactivated, and omitting the identified data segments from the copying of the data from the at least one storage device that is being deactivated to the one or more reduced power consuming storage device; and wherein further the copying the data from the one or more reduced power consuming storage devices to the at least one storage device that is being activated comprises identifying data segments already stored on the at least one storage device that is being activated that are equivalent to data segments on the one or more reduced power consuming storage devices, and omitting the identified data segments from the copying of the data from the one or more reduced power consuming storage devices to the at least one storage device that is being activated.

7. The method of claim 5, further comprising the steps of:
activating at least one additional storage device of the storage system from the reduced power consuming state to the active state in response to a determination that a third parameter has crossed a third threshold, greater than the first threshold, thereby indicating a further increase in the storage activity of the storage system, or in response to a pre-set transition time for activity the at least one additional storage device; and deactivating at least one additional storage device of the storage system to the reduced power consuming state in response to a determination that a fourth parameter has crossed a fourth threshold, less than the second threshold, thereby indicating a further decrease in storage activity of the storage system, or in response to a pre-set transition time for deactivating the at least one additional storage device.

8. The method of claim 5, wherein the pre-set transition time for activating the at least one storage device is set such that the historical empirical information of storage activity derived from the lifecycle information reveals storage activity that is above the first threshold a predefined percentage of the time and wherein the pre-set transition time for deactivating the at least one storage device is set such that the historical empirical information of storage activity derived from the lifecycle information reveals storage activity that is below the second threshold the predefined percentage of the time.

9. A storage system comprising:
multiple storage devices arranged to provide redundant storage of data;
at least one reduced power consuming storage device, consuming less power to store an equivalent amount of data as the multiple storage devices, and comprising a greater storage capacity than individual ones of the multiple storage devices;
at least one processing unit; and
instructions for execution by the at least one processing unit that cause the at least one processing unit to perform steps comprising:
making a first determination that either a first parameter has crossed a first threshold indicating a decrease in storage activity associated with the storage system or a first pre-set transition time has been reached;
changing, based on the first determination, a power consuming state of at least one storage device of the multiple storage devices from an active state to a reduced power consuming state, the at least one storage device comprising data redundant to data of at least one other storage device of the storage system that will remain in an active state while the at least one storage device is in the reduced power consuming state;
copying data from the at least one storage device to at least one partition on the at least one reduced power consuming storage device prior to changing the power consuming state of the at least one storage device;
assigning redundant data responsibilities of the at least one storage device to the at least one reduced power consuming storage device after the power consuming state of the at least one storage device has been changed to the reduced power consuming state;
making a second determination that either a second parameter has crossed a second threshold indicating an increase in storage activity associated with the storage system or a second pre-set transition time has been reached;

changing, based on the second determination, the power consuming state of the at least one storage device from the reduced power consuming state to the active state; and storing, on the at least one storage device, new data reflective of changes to data stored by the at least one other storage device since the at least one storage device was last placed into the reduced power consuming state, the storing being performed with reference to lifecycle information associated with data stored on either of the at least one other storage device or the at least one reduced power consuming storage device;

wherein the first and second pre-set transition times were set based on historical empirical information of storage activity derived from lifecycle information.

10. The storage system of claim 9, further comprising a controller, the controller comprising the at least one processing unit and the instructions.

11. The storage system of claim 9, wherein the multiple storage devices comprise the at least one processing unit and the instructions.

12. The storage system of claim 9, wherein the instructions cause the at least one processing unit to perform further steps comprising:

making a third determination that either a third parameter has crossed a third threshold indicating a continuing decrease in storage activity associated with the storage system from that indicated by the crossing of the first threshold by the first parameter or a third pre-set transition time has been reached;

changing, based on the third determination, a power consuming state of at least one additional storage device of the multiple storage devices from the active state to the reduced power consuming state;

copying data from the at least one additional storage device to the at least one storage reduced power consuming storage device prior to changing the power consuming state of the at least one additional storage device;

making a fourth determination that either a fourth parameter has crossed a fourth threshold indicating a continuing increase in storage activity associated with the storage system from that indicated by the crossing of the second threshold by the second parameter or a fourth pre-set transition time has been reached; and changing, based on the fourth determination, the power consuming state of the at least one additional storage device from the reduced power consuming state to the active state;

copying data from the at least one reduced power consuming storage device to the at least one additional storage device after changing the power consuming state of the at least one additional storage device to the active state.

13. The system of claim 9, wherein the first pre-set transition time is set such that the historical empirical information of storage activity derived from the lifecycle information reveals storage activity that is below the first threshold a predefined percentage of the time and wherein the second pre-set transition time is set such that the historical empirical information of storage activity derived from the lifecycle information reveals storage activity that is above the second threshold the predefined percentage of the time.

* * * * *